United States Patent
Katagiri et al.

(10) Patent No.: US 9,619,147 B2
(45) Date of Patent: *Apr. 11, 2017

(54) READING ORDER SEARCH METHOD AND PROGRAM FOR RECORDING

(71) Applicant: INTERNATIONAL BUSINESS MACHINES CORPORATION, Armonk, NY (US)

(72) Inventors: Takashi Katagiri, Tokyo (JP); Mitsuhiro Nishida, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/988,918

(22) Filed: Jan. 6, 2016

(65) Prior Publication Data

US 2016/0117111 A1 Apr. 28, 2016

Related U.S. Application Data

(63) Continuation of application No. 14/176,291, filed on Feb. 10, 2014, now Pat. No. 9,263,064.

(30) Foreign Application Priority Data

Mar. 14, 2013 (JP) ................................ 2013-051201

(51) Int. Cl.
*G11B 5/008* (2006.01)
*G11B 20/10* (2006.01)
(Continued)

(52) U.S. Cl.
CPC .......... *G06F 3/0604* (2013.01); *G06F 3/0638* (2013.01); *G06F 3/0682* (2013.01);
(Continued)

(58) Field of Classification Search
CPC .... G06F 3/0604; G06F 3/0638; G06F 3/0682; G11B 5/00817; G11B 20/10; G11B 20/1201; G11B 27/105
See application file for complete search history.

(56) References Cited

U.S. PATENT DOCUMENTS 5,845,316 A * 12/1998 Hillyer ................... G06F 3/061
 710/244
6,763,427 B1 7/2004 Doi et al.
(Continued)

FOREIGN PATENT DOCUMENTS

JP 2000048549 A 2/2000
JP 2010097646 A 4/2010
(Continued)

*Primary Examiner* — Eric Oberly
(74) *Attorney, Agent, or Firm* — Griffiths & Seaton PLLC

(57) ABSTRACT

The present invention provides a search method used to search for the reading order of a plurality of recording groups when the plurality of recording groups written on tape are continuously read by a tape drive which manages data on tape in recording units having a fixed data length for each recording. This search method includes the steps of: receiving information on a plurality of tape groups to be read; and sorting the plurality of recording groups to be read so the reading time is shortened. In the sorting step, the time required to sort the plurality of reading groups is reduced by combining two or more recording groups into a single object to be sorted in the sorting step when at least two or more contiguous recording groups have been assigned to the same region or are assigned across adjacent regions among the plurality of regions.

9 Claims, 5 Drawing Sheets

(51) Int. Cl.
*G11B 20/12* (2006.01)
*G11B 27/10* (2006.01)
*G06F 3/06* (2006.01)

(52) U.S. Cl.
CPC .......... *G11B 5/00817* (2013.01); *G11B 20/10* (2013.01); *G11B 20/1201* (2013.01); *G11B 27/105* (2013.01)

(56) References Cited

U.S. PATENT DOCUMENTS

| | | |
|---|---|---|
| 8,526,136 B2 | 9/2013 | Katagiri et al. |
| 8,537,490 B2 | 9/2013 | Katagiri et al. |
| 8,654,476 B2 | 2/2014 | Katagiri et al. |
| 8,867,160 B2 | 10/2014 | Katagiri et al. |
| 2001/0034811 A1* | 10/2001 | Basham ............ G06F 3/0611 711/111 |
| 2006/0149898 A1 | 7/2006 | Bello et al. |
| 2009/0248974 A1 | 10/2009 | Bello et al. |
| 2012/0054428 A1 | 3/2012 | Butt et al. |
| 2012/0154946 A1 | 6/2012 | Katagiri et al. |
| 2012/0162807 A1 | 6/2012 | Katagiri et al. |
| 2012/0250176 A1 | 10/2012 | Katagiri et al. |
| 2014/0268399 A1 | 9/2014 | Katagiri et al. |
| 2015/0055442 A1 | 2/2015 | Katagiri et al. |

FOREIGN PATENT DOCUMENTS

| | | |
|---|---|---|
| JP | 2011113605 A | 6/2011 |
| JP | 2012009105 A | 1/2012 |
| JP | 2012128937 A | 7/2012 |
| WO | 2010073776 A1 | 7/2010 |
| WO | 2012025492 A1 | 3/2012 |

\* cited by examiner (a)

(b)

(a)

(b)

(c)

(a)

(b)

(c)

(d)

READING ORDER SEARCH METHOD AND PROGRAM FOR RECORDING

PRIORITY CLAIM

This application is a Continuation of U.S. patent application Ser. No. 14/176,291, filed on Feb. 10, 2014, which claims priority to Japanese Patent Application No. 2013-051201 filed on Mar. 14, 2013, both of which are hereby incorporated by reference in their entirety.

BACKGROUND OF THE INVENTION

Field of the Invention

The present invention relates to a tape drive and, more specifically, to a method of searching for a reading order for recording groups on tape in a tape drive.

Description of the Related Art

Recently, tape drives are being used in file systems and virtual tape servers (VTS) to transfer large amounts of data at high speeds in accordance with the increasing capacity of tape media (referred to simply as "tapes" in the present specification). These tape drives require the ability to read a plurality of data elements written to scattered segments of tape as a whole.

However, when these data elements are written to scattered segments of tape which has a length of hundreds of meters and the data read without consideration to reading order, it takes a long time for the head to travel to (and be positioned at) the start of each data segment, and this results in significant delays in reading the request data from the host as a whole.

As a method of ameliorating this problem, a nearest neighbor algorithm (referred to as a "nearest selection method" in the present specification) and a pairwise exchange algorithm (referred to as a "last replacement method" in the present specification) have been disclosed in Japanese Patent Publication No. 2012-128937.

SUMMARY OF THE INVENTION

The methods in Japanese Patent Publication No. 2012-128937 can reduce the overall amount of time required for head positioning when data is read as a whole. However, the present inventors have discovered problems. As the number of data segments to be read increases, the processing time required for head positioning, that is, the time required to search for (and sort) the data segments into the reading order, also increases. Sometimes this results in the inability to respond to a read request from the host within the predetermined response time.

Therefore, it is an object of the present invention to reduce this technical problem associated with the prior art by providing a search method that is able to reduce the search (sorting) time required to determine an order for reading the data as a whole, so the overall processing time required by a host to read data as a whole can be improved.

The present invention provides a search method used to search for the reading order of a plurality of recording groups when the plurality of recording groups written on tape are continuously read by a tape drive which manages data on tape in recording units having a fixed data length for each recording. These recording groups are known as user data segments (referred to as "UDS" in the present specification and having the same meaning as "recording group" in the following explanation), each recording group including at least one recording, and each recording group having a recording number at the beginning and a recording number at the end. The UDS information lists the recording groups to be read continuously by a host application. Before the data is accessed, a SCSI command such as GRAO (Generate Recommended Access Order) is provided to the drive by the host application, and the data drive receiving this information retains the list of recording groups.

A predetermined number of regions is established in the longitudinal direction of each wrap of tape, and at least one recording group is assigned to each of the plurality of regions. The search method includes the steps of receiving information on a plurality of tape groups to be read, and sorting the plurality of recording groups to be read so the reading time is shortened.

The time required to sort the plurality of reading groups is reduced by combining two or more recording groups into a single object to be sorted in the sorting step when at least two or more contiguous recording groups have been assigned to the same region or are assigned across adjacent regions among the plurality of regions.

The present invention is able to reduce the time required to sort the data to be read by reducing the number of units of data (the number of recording groups) to be sorted on the tape for reading, that is, the number of searches (patterns).

In one aspect of the present invention, the step of sorting the plurality of recording groups includes the steps of assigning consecutive numbers to each of the plurality of recording groups in ascending order from the beginning of each recording group and sorting the recording groups, and continuously searching for the next recording group to be read after one recording group has been read. The searching step includes selecting the next recording group so that the travel time of the reading head to the start position of the next recording group inside the region assigned to the group is minimized. The smallest recording number among two or more combined recording groups is the first recording number of the combined recording group when two or more recording groups have been combined, and the largest recording number is the final recording number in the combined recording groups.

This aspect of the present invention is able to reduce the time required to sort data to be read by reducing the number of searches (patterns) when the nearest selection method in Japanese Patent Publication No. 2012-128937 is used.

In one aspect of the present invention, the step of sorting the plurality of recording groups includes the step of searching for the final recording group to be inserted after another recording group in a sequence of recording groups not in the final position on the basis of whether or not the overall reading time for the plurality of recording groups is shorter. The searching step includes combining the final recording group with at least one previous recording group, and inserting the two or more combined recording groups after another uncombined recording group on the basis of whether or not the overall reading time for the plurality of recording groups is shorter.

This aspect of the present invention is able to reduce the time required to sort data to be read by reducing the number of searches (patterns) when the last replacement method in Japanese Patent Publication No. 2012-128937 is used.

In one aspect of the present invention, the tape drive is a tape drive that is communicatively connected to a host in a file system or virtual tape server (VTS). The information on the plurality of recording groups to be read is sent from the host to the tape drive, and the plurality of recording groups sorted in the sorting step is sent from the tape drive to the host.

This aspect of the present invention is able, in a short period of time, to receive a read request from the host, to sort the plurality of recording groups to be read so that the time required to read the data as a whole is shortened, and to reply to the host.

DETAILED DESCRIPTION

Figure 1:
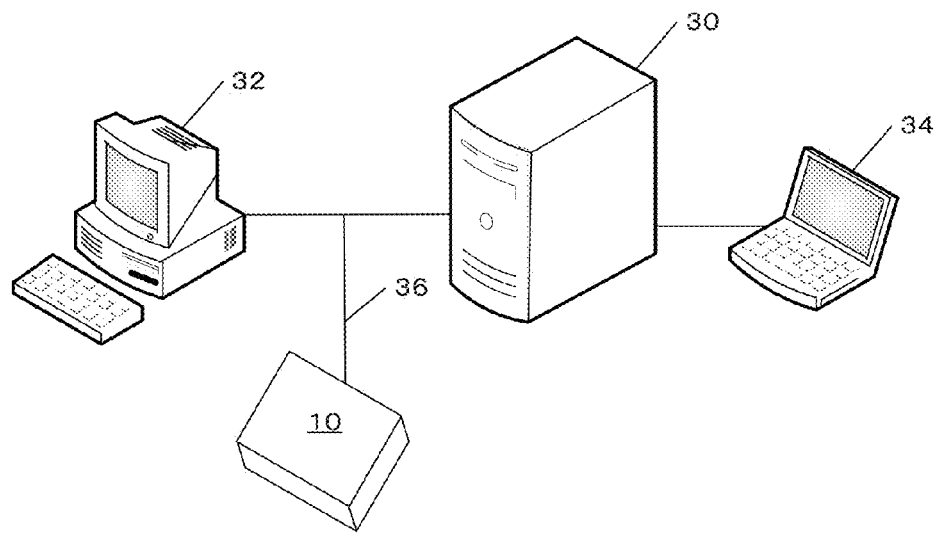
FIG. 1 is a diagram showing an example of a configuration for a file system using a tape drive of the present invention.

The following is an explanation of an embodiment of the present invention with reference to the drawings. FIG. 1 is a diagram showing an example of a configuration for a file system using a tape drive of the present invention. The file system 100 can include a tape drive 10, a host (server) 30, and PCs (terminals) 32, 34 able to communicate with each other via a network 36. In FIG. 1, there is only one tape drive 10 and host (server) 30, but this is merely for illustrative purposes. The file system can also include two or more tape drives 10 and hosts (servers) 30.

The file system 100 can be a linear tape file system (LTFS). An LTFS is configured so that files stored on a tape cartridge inserted into a tape drive can be accessed directly in a manner similar to other types of removable recording media such as HDD, USB memory and CD-Rs.

Figure 2:
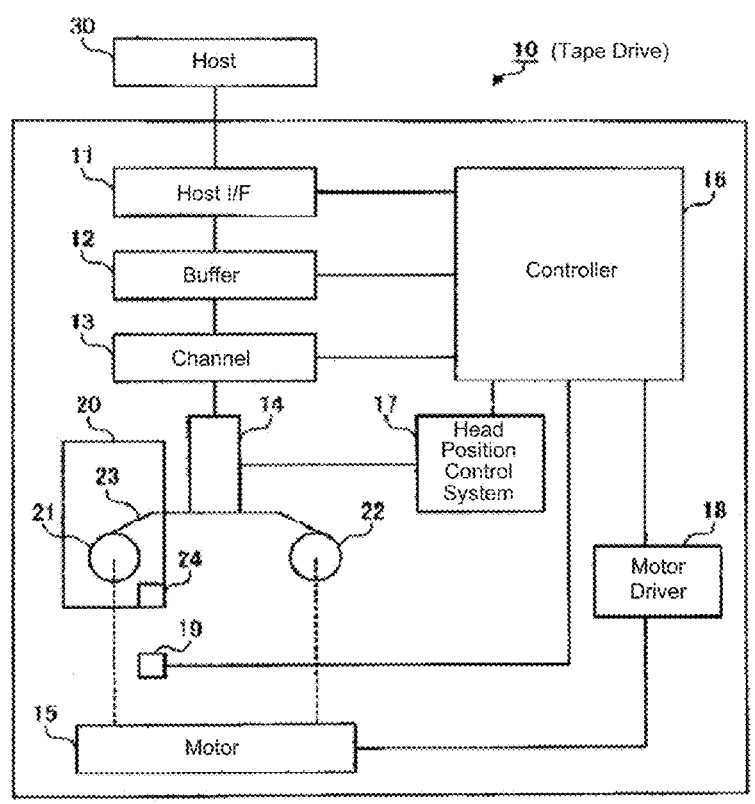
FIG. 2 is a diagram showing an example of a configuration for a tape drive of the present invention.

FIG. 2 is a diagram showing an example of a configuration for a tape drive of the present invention. The tape drive 10 includes a host interface (I/F) 11, buffer 12, channel 13, head 14, and motor 15. The controller 16 includes a head position control system 17 and a motor driver 18. Because a tape cartridge 20 can be inserted and loaded into the tape drive 10, a tape cartridge 20 is also depicted. This tape cartridge 20 contains tape 23 wound around reels 21, 22. The tape 23 moves longitudinally from real 21 to real 22 or from real 22 to real 21 as the reels 21, 22 rotate. The tape 23 in this example is magnetic tape, but can be a tape medium other than magnetic tape.

The tape cartridge 20 also includes cartridge memory (CM) 24. The CM 24 contains information such as how data is written on the tape 23. For example, data can be accessed at high speeds without contact using an RF interface by indexing the data written on the tape 23 and adjusting usage of the tape 23. In FIG. 2, the interface used to access the CM 24, such an RF interface, is denoted as the cartridge memory interface (CMI/F) 19.

Here, the host I/F 11 communicates with the host (server) 30 and another PC 32. For example, commands are received from the OS of the host 30 such as commands to write data to the tape 23, commands to move the tape 23 to a target position, and commands to read data from the tape 23. In the case of an LTFS, the data in the tape drive is referenced directly by the OS of the desktop, and files can be executed by double clicking or copied by dragging and dropping in the same way as files inside an HDD.

The buffer 12 is memory used to store data that is to be written to the tape 23 or data that has been read from the tape 23. This can be DRAM. The buffer 12 has a plurality of buffer segments, and each buffer segment stores a data set as a unit to be written to the tape 23.

The channel 13 is a communication path used to send data to the head 14 that is to be written to the tape 23 and to receive data from the head 14 that has been read from the tape 23. As the tape 23 travels longitudinally, the head 14 writes information to the tape 23 and reads information from the tape 23. The motor 15 rotates the reels 21, 22. In FIG. 2, the motor 15 is represented by a single square, but the use of two motors 15 is preferred, one for each reel 21, 22.

The controller 16 controls the entire tape drive 10. The method and program of the present invention are executed by the controller 16. The controller 16 controls the writing of data to the tape 23 and the reading of data from the tape 23 in accordance with commands received by the host I/F 11. It also controls the head position control system 17 and the motor driver 18. The head position control system 17 is a system which tracks down the desired wrap. Here, a wrap is a group of tracks on a tape 23. When the head 14 is reading a large amount of data on a tape 23, this is a group of data segments on the single side of the rotated portion when the tape 23 is reciprocating dozens of times in the longitudinal direction. When it is necessary to switch wraps, the head 14 has to be switched electrically. This switching control is performed by the head position control system 17.

The motor driver 18 drives the motor 15. If two motors 15 are used, as mentioned above, two motor drivers 18 are also used. A CM I/F 19 is realized using an RF reader/writer to write information to the CM 24 and read information from the CM 24.

Figure 3:
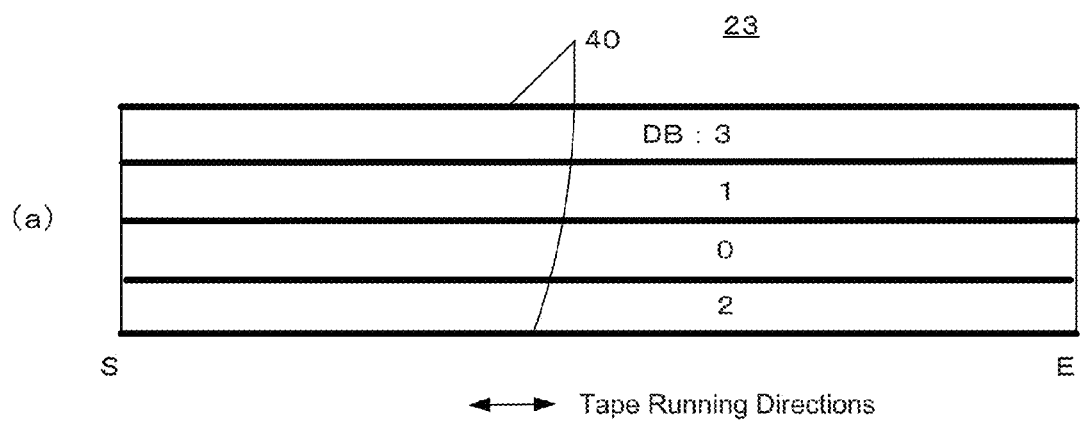
FIG. 3 is a diagram showing an example of a configuration for the tape of the present invention.
Figure 3:
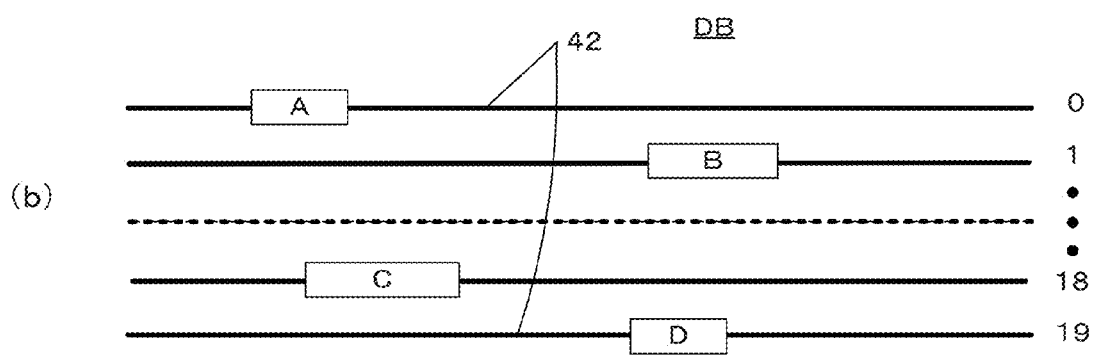

FIG. 3 is a diagram showing an example of a configuration for tape 23 used inside the tape cartridge 20 of the present invention. FIG. 3 shows an example of tape 23 supported by an IBM Enterprise tape drive. In the following explanation, an IBM Enterprise tape drive is used as an example of a tape drive, but the embodiment of the present invention is not restricted to this example. FIG. 3 (*a*) shows the entire tape 23, and FIG. 3 (*b*) shows an example of the configuration of a single data band (DB) of the tape 23.

In FIG. 3 (*a*), the recording surface has five servo bands 40 sandwiching four data bands DB0-3 on 12.65 mm-wide tape. Each servo band 40 has a prerecorded servo pattern for precise tracking of the head 14. The tape drive 10 reads the servo patterns on the two servo bands 40 on either side of each data band DB0-3 in order to align the head 14 with precision to read and write data.

In FIG. 3 (*b*), there are twenty wraps 42 as described above on a single data band (DB) (eighty on the entire tape), and data (recordings) are written in sequential order on each wrap 42. The recording numbers (serial numbers) for these are managed by the tape drive 10 and the host 30 in the order in which they were recorded.

Each wrap 42 is divided into a predetermined number of regions (for example, 64 regions), and detailed information indicating which recording numbers are stored in each region is used to create a high-resolution tape directory (HRTD) when the recordings are created, and the HRTD is stored in either the CM 24 or a predetermined tape region. When a tape cartridge 20 is loaded into the tape drive 10, the tape drive 10 reads the HRTD to determine where each recording is located. When data is read, the region including the recording (or UDS) is calculated using the HRTD, the start point is the physical location (on the tape) of the beginning of the HRTD including the recording to be read, and the serial numbers of the recording are scanned and read in order to find the target data.

An IBM Enterprise tape drive uses the recommended access order (RAO) function to determine the reading order of scattered recording groups (for example, A-D in the drawing) as shown in FIG. 3 (b). (As mentioned above, "recording group" has the same meaning as "UDS".) The RAO function is used by the tape drive 10 to sort the data reading order in order to reduce the amount of time required to move (and align) the head at the beginning of each data segment. Before the user data segments are read, the host 30 sends information (a list) with the starting recording number and final recording number of each UDS to the tape drive 10 using a GRAO command as mentioned above. The tape drive 10 creates a list in which the information in this list is sorted to reduce the amount of time required to align the head. Next, the host 30 receives this sorted list using a receive recommended access order (RRAO) command. The host 30 reduces the data reading time by reading the data according to the list of sorted user data segments. The timeout period for the GRAO command and RRAO command can be set, for example, to 30 seconds.

The method of the present invention is used to sort a list of user data segments (UDS) received by the tape drive 10 from the host 30 using a GRAO command in order to reduce the amount of time required to align the head. This method is characterized by the use of BIND attributes described below. A list sorted using the method of the present invention is returned from the tape drive 10 to the host 30 using an RRAO command.

As mentioned above, the reading operation performed by the tape drive 10 uses an HRTD entry as a starting point. When there are multiple user data segments (UDS) between one HRTD entry and another HRTD entry in the same region of the same wrap, both entries are treated as continuous data in order to read the latter UDS (with the larger beginning recording number) after the previous UDS (with the smaller beginning recording number). Even data segments spanning adjacent regions of the same wrap can be treated as continuous data because backhitch occurs when the head moves to another wrap. This minimizes the time required to align data.

As mentioned above, the number of HRTD entries in each wrap is 64. When data is assembled in the same or adjacent entries, a maximum of 32 data groups can be created. The maximum number of data elements is 2,560 when the total number of wraps on the tape is 80. When the physical location is being estimated, scanning is performed to determine if there is more data in the same or adjacent HRTD entries. When there is another UDS, an attribute called BIND is assigned to the next UDS. Here, a BIND attribute means to continue reading after the previous data has been verified. When the nearest selection method or last replacement method in Patent Literature 1 is used, the present invention (present example) reduces the number of scans (searches) by skipping data with a BIND attribute in the scanning (searching) process. The details are explained below.

BIND-Attributed Nearest Selection Method

In the nearest selection method, the time required to align all user data segments (UDS) from the current data position (the position specified by a recording number) is calculated, the one with the smallest number is set as the next UDS to be read, the time required to align the remaining user data segments (UDS) from the final location of the next UDS is calculated, the one with the smallest number is set as the next UDS to be read, and this process is repeated until the end.

The BIND-attributed nearest selection method in the present invention first determines whether each UDS has a BIND attribute. In the UDS list received using a GRAO command, each UDS is sorted in descending order based on the recording number at the beginning of the segment, and a number is assigned to each UDS. In the method described above, BIND attributes can be assigned, and the user data segments (UDS) sorted by recording number are used to assign a BIND attribute to each UDS. Next, the time required to align all user data segments (UDS) without BIND attributes is calculated from the current data position (the position specified by a recording number) is calculated, and the one with the smallest number is set as the next UDS to be read. If there is a data group with a BIND attribute, this is the next UDS. An example is shown in FIG. 4.

Figure 4:
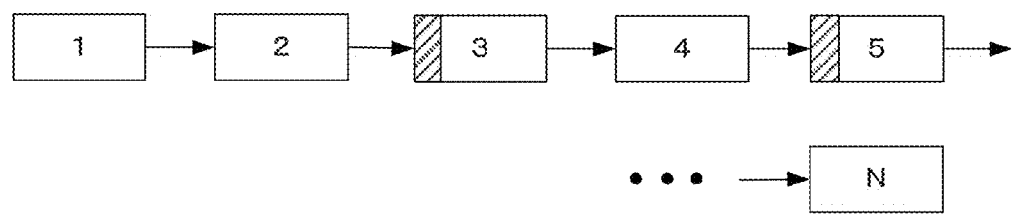
FIG. 4 is a diagram used to explain the BIND-attributed nearest selection method of the present invention.
Figure 4:
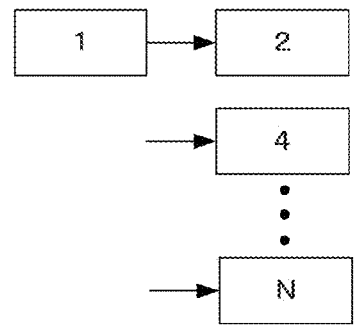
Figure 4:
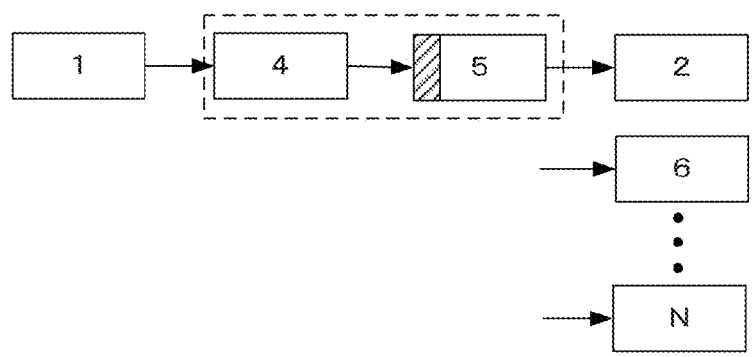

Among the UDS 1 and the UDS N to be read, as shown in FIG. 4 (a), UDS 3 and 5 have BIND attributes because they are in the same or adjacent region of the same wrap of the tape. As shown in FIG. 4 (b), the time required to align each user data segment (UDS) without a BIND attribute from user data segment 1 (UDS 2, 4, . . . N) is calculated as t(1, 2), t(1, 4) . . . t(1, N) to determine the smallest value. Here, the alignment processing time t(A, B) is the alignment processing time required to move from the current data position A to the target data position B. This is determined using Equation (1).

$$t(A,B)=t_{LEN}(A,B)+t_{BAND}(A,B)+t_{DIR}(A,B) \qquad (1)$$

$t_{LEN}(A, B)$ is the travel time along the length of the tape, $t_{BAND}(A, B)$ is the travel time across the width of the tape, and $t_{DIR}(A, B)$ is the time required to change the direction of travel along the tape.

Here, t(1, 4) has the smallest value. UDS 5 has a BIND attribute and is combined with UDS 4, so this is treated as a single UDS. As shown in FIG. 4 (c), the alignment processing time to the next UDS (UDS 2, 6, . . . N) from UDS 5 is calculated as t(5, 2), t(5, 6), . . . t(5, N) to search for the smallest value. The calculation and search for the smallest value is then continued in the same manner. In this method, the number of user data segments (UDS) used to calculate the alignment processing time can be reduced to the number of UDS with BIND attributes. This can significantly reduce alignment processing times.

(B) BIND-Attributed Last Replacement Method

The last replacement method performs scans to determine whether the movement and insertion of the final UDS at a position other than the last position will reduce alignment times. When the position with a shorter time has been found, the segment is inserted in this position, and the process is repeated on the next final UDS. When a position cannot be found to insert the final (Nth) UDS, the process is ended.

In the BIND-attributed last replacement method, user data segments (UDS) without BIND attributes are searched for from the very end position, and a scan is performed to determine whether a UDS from its current position to the very end position can be inserted in front of a UDS without a BIND attribute, that is, whether the overall alignment processing time can be reduced. It is inserted if possible. If not, the process is resumed using a UDS without a BIND attribute located at a prior position, and the scanning is repeated. An example is shown in FIG. 5.

Figure 5:
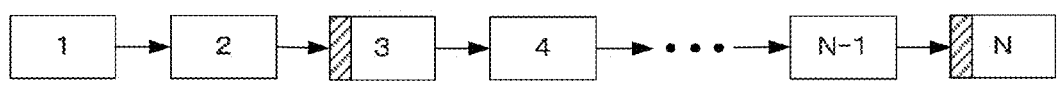
FIG. 5 is a diagram used to explain the BIND-attributed last replacement method of the present invention.
Figure 5:
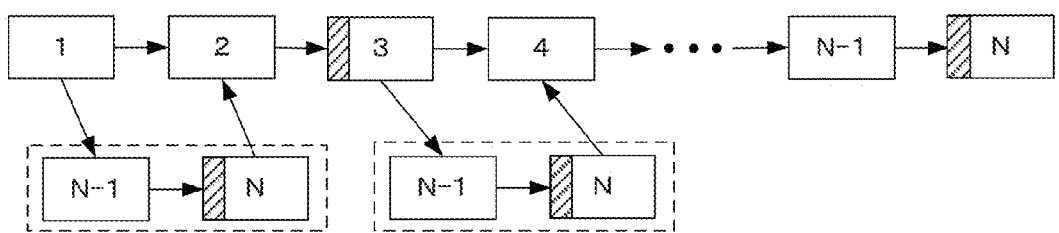
Figure 5:
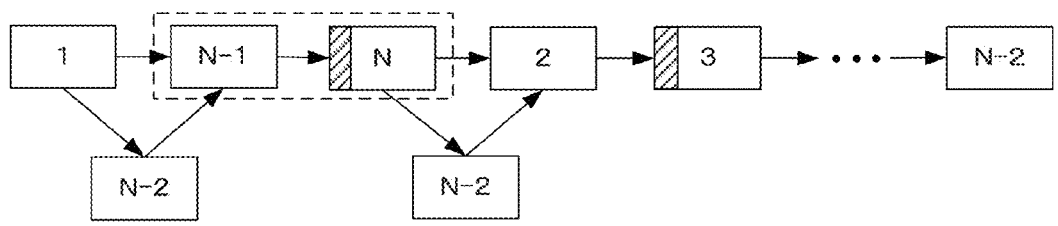
Figure 5:
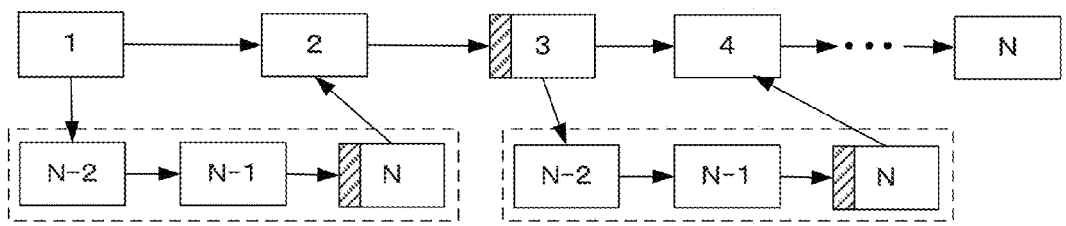

Among the UDS 1 and the UDS N to be read, as shown in FIG. 5 (a), UDS 3 and N have BIND attributes because they are in the same or adjacent region of the same wrap of the tape. As shown in FIG. 5 (b), UDS N with a BIND attribute is combined with UDS N−1 and treated as a single UDS. The process then searches for M which satisfies Equation (2) below.

$$t(M,M+1)+t(N-2,N-1) > t(M,N-1)+t(N,M+1) \quad (2)$$

Here, M which satisfies Equation (2) is 1 (M=1). Next, as shown in FIG. 5 (c), the combined UDS N−1 and UDS N are inserted between UDS 1 and 2, and the process searches for M which satisfies Equation (3) below for UDS N−2 in front of this which does not have a BIND attribute.

$$t(M,M+1)+t(N-3,N-2) > t(M,N-2)+t(N-2,M+1) \quad (3)$$

When an M which satisfies Equation (2) cannot be found, it is combined with UDS N−2 in front of this which does not have a BIND attribute. UDS N−2, N−1 and N are treated as a single UDS and, as shown in FIG. 5 (d), and the search is performed in the same way to find a location to insert the combined UDS. In this method, the number of user data segments (UDS) used to calculate the alignment processing times can be reduced to the number of UDS with BIND attributes. This significantly reduces alignment processing times.

Figure 6:
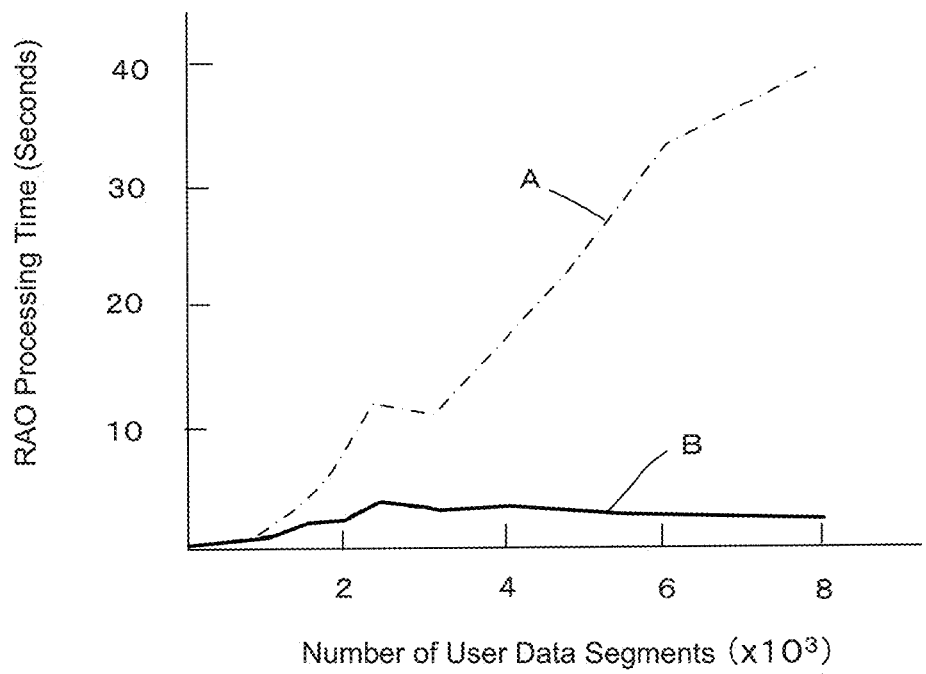
FIG. 6 is a diagram showing the relationship between the number of user data segments (UDS) and the processing time.

FIG. 6 is a diagram showing the relationship between the number of user data segments (UDS) and the sorting (RAO) processing time. In FIG. 6, Graph A shows the RAO processing times required for sorting when the nearest selection method and last replacement method in Patent Literature 1 are used. Graph B shows the RAO processing times for sorting when the BIND-attributed nearest selection method and BIND-attributed last replacement method of the present invention are used which incorporate BIND attributes. It is clear in a comparison of Graph A and Graph B that use of the methods of the present invention do not increase RAO processing times even when the number of user data segments (UDS) handled is increased. This is probably because RAO processing times are determined largely by the number of user data segments (UDS) without BIND attributes.

Figure 7:
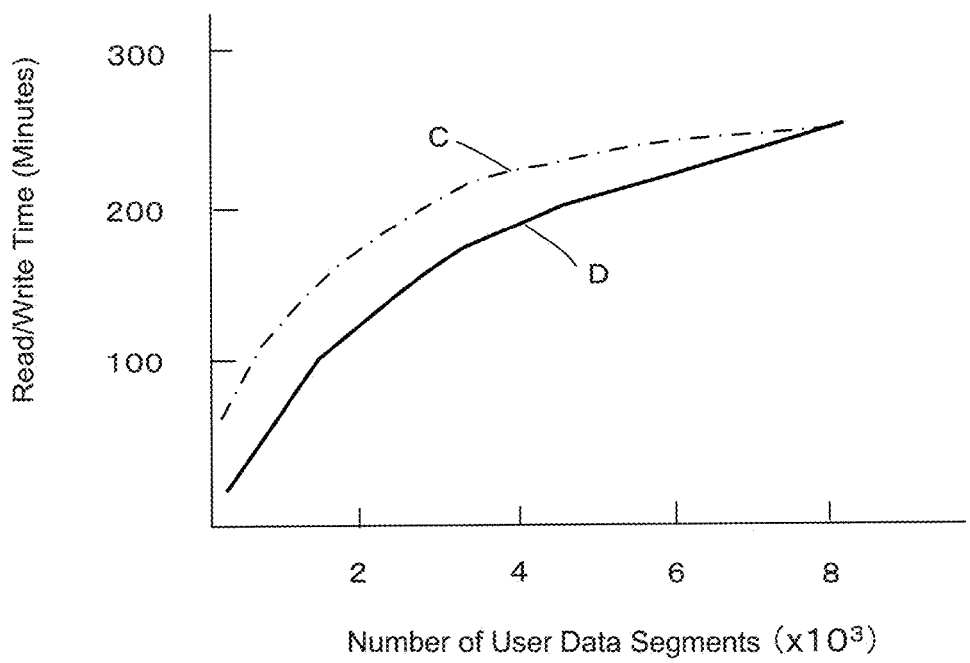
FIG. 7 is a diagram showing the relationship between the number of user data segments (UDS) and the reading time.

FIG. 7 is a diagram showing the relationship between the number of files and reading times. In FIG. 7, Graph C is for the total time required when serial numbers are assigned to each UDS in sequential order starting with the first UDS, and the UDS are read in sequential order according to the serial numbers. Graph D shows the total time required to read the data when the BIND-attributed nearest selection method and BIND-attributed last replacement method of the present invention are used which incorporate BIND attributes. It is clear in a comparison of Graph C and Graph D that use of the methods of the present invention can improve the time required to read user data segments (UDS) up to a total of 8,000 user data segments (UDS). It cannot improve reading times whether there are more than 8,000 user data segments because it takes just as much time to read such a large number of user data segments (UDS) as it does to read the data in sequential order from beginning to end (that is, in numerical order according to serial number).

The present invention was explained above with reference to embodiments, but the present invention is not limited to these examples. It should be readily be apparent to those skilled in the art that various improvements, modifications and alterations can be made without departing from the spirit and scope of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A method for searching a reading order of a plurality of recording groups when the plurality of recording groups written on a tape are continuously read by a tape drive which manages data on the tape in recording units having a fixed data length for each recording, the method comprising the steps of:
receiving information on a plurality of recording groups to be read, each of the plurality of recording groups having at least one recording, a recording number at a beginning and a recording number at an end of each recording group being managed by the tape drive, a predetermined number of regions being established in a longitudinal direction of each wrap of the tape, the predetermined number of regions making up a plurality of regions, and at least one recording group being assigned to each of the predetermined number of regions; and
sorting the plurality of recording groups to be read so a reading time thereof is shortened;
wherein a time required to sort the plurality of recording groups is reduced by combining two or more recording groups into a single object to be sorted in the sorting step when at least two or more contiguous recording groups have been assigned to the same region or across adjacent regions among the plurality of regions;
the step of sorting the plurality of recording groups further comprises the steps of:
assigning consecutive numbers to each of the plurality of recording groups in ascending order from a beginning of each recording group and sorting the recording groups, and
continuously searching for a next recording group to be read after one recording group has been read, and
the searching step includes selecting the next recording group so that a travel time of a reading head to a start position of the next recording group inside a region of the plurality of regions assigned to the next recording group is minimized.

2. The method according to claim 1, wherein:
the step of sorting the plurality of recording groups includes the step of searching for a final recording group to be inserted after another recording group in a sequence of recording groups not in a final position, the searching for the final recording group performed on the basis of whether or not an overall reading time for the plurality of recording groups is shortened; and
the searching step includes combining the final recording group with at least one previous recording group, and inserting the two or more combined recording groups after another uncombined recording group on the basis of whether or not the overall reading time for the plurality of recording groups is shorter.

3. The method according to claim 1, wherein:
the tape drive is communicatively connected to a host in a file system or virtual tape server (VTS), and
the method further includes:
sending the information on the plurality of recording groups to be read from the host to the tape drive, and
in the sorting step, sending the sorted plurality of recording groups from the tape drive to the host.

4. A system for searching a reading order of a plurality of recording groups when the plurality of recording groups written on a tape are continuously read by a tape drive which manages data on the tape in recording units having a fixed data length for each recording, system comprising:
a memory; and
a processing device coupled to the memory, the processing device:
receiving information on a plurality of recording groups to be read, each of the plurality of recording groups having at least one recording, a recording number at a beginning and a recording number at an end of each recording group being managed by the tape drive, a predetermined number of regions being established in a longitudinal direction of each wrap of the tape, the predetermined number of regions making up a plurality of regions, and at least one recording group being assigned to each of the predetermined number of regions; and sorting the plurality of recording groups to be read so a reading time thereof is shortened;

wherein a time required to sort the plurality of recording groups is reduced by combining two or more recording groups into a single object to be sorted in the sorting step when at least two or more contiguous recording groups have been assigned to the same region or across adjacent regions among the plurality of regions;

the processing device is further, during the sorting the plurality of recording groups:

assigning consecutive numbers to each of the plurality of recording groups in ascending order from a beginning of each recording group and sorting the recording groups, and continuously searching for a next recording group to be read after one recording group has been read; and the searching step includes selecting the next recording group so that a travel time of a reading head to a start position of the next recording group inside a region of the plurality of regions assigned to the next recording group is minimized.

5. The system according to claim 4, wherein the processing device is:

during the sorting the plurality of recording groups, searching for a final recording group to be inserted after another recording group in a sequence of recording groups not in a final position, the searching for the final recording group performed on the basis of whether or not an overall reading time for the plurality of recording groups is shortened; and for the searching, combining the final recording group with at least one previous recording group, and inserting the two or more combined recording groups after another uncombined recording group on the basis of whether or not the overall reading time for the plurality of recording groups is shorter.

6. The system according to claim 4, wherein:

the tape drive is communicatively connected to a host in a file system or virtual tape server (VTS), and the processor is further:

sending the information on the plurality of recording groups to be read from the host to the tape drive, and in the sorting step, sending the sorted plurality of recording groups from the tape drive to the host.

7. A computer program product including a non-transitory computer readable medium for storing instructions for a method for searching a reading order of a plurality of recording groups when the plurality of recording groups written on a tape are continuously read by a tape drive which manages data on the tape in recording units having a fixed data length for each recording, the computer program product comprising the steps of:

computer code for receiving information on a plurality of recording groups to be read, each of the plurality of recording groups having at least one recording, a recording number at a beginning and a recording number at an end of each recording group being managed by the tape drive, a predetermined number of regions being established in a longitudinal direction of each wrap of the tape, the predetermined number of regions making up a plurality of regions, and at least one recording group being assigned to each of the predetermined number of regions; and computer code for sorting the plurality of recording groups to be read so a reading time thereof is shortened;

wherein a time required to sort the plurality of recording groups is reduced by combining two or more recording groups into a single object to be sorted in the sorting step when at least two or more contiguous recording groups have been assigned to the same region or across adjacent regions among the plurality of regions;

the computer code for sorting the plurality of recording groups further comprises:

computer code for assigning consecutive numbers to each of the plurality of recording groups in ascending order from a beginning of each recording group and sorting the recording groups, and computer code for continuously searching for a next recording group to be read after one recording group has been read; and the computer code for searching includes computer code for selecting the next recording group so that a travel time of a reading head to a start position of the next recording group inside a region of the plurality of regions assigned to the next recording group is minimized.

8. The computer program product according to claim 7, wherein:

the computer code for sorting the plurality of recording groups includes computer code for searching for a final recording group to be inserted after another recording group in a sequence of recording groups not in a final position, the searching for the final recording group performed on the basis of whether or not an overall reading time for the plurality of recording groups is shortened; and the computer code for searching step includes computer code for combining the final recording group with at least one previous recording group, and inserting the two or more combined recording groups after another uncombined recording group on the basis of whether or not the overall reading time for the plurality of recording groups is shorter.

9. The computer program product according to claim 7, wherein:

the tape drive is communicatively connected to a host in a file system or virtual tape server (VTS), and the computer program product further includes:

computer code for sending the information on the plurality of recording groups to be read from the host to the tape drive, and in the computer code for sorting, computer code for sending the sorted plurality of recording groups from the tape drive to the host.

* * * * *